(12) United States Patent
Grosshauser

(10) Patent No.: US 6,864,599 B1
(45) Date of Patent: Mar. 8, 2005

(54) SYSTEM AND METHOD FOR TESTING AN IGNITION DEVICE

(75) Inventor: Frank Grosshauser, Schrobenhausen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/149,716

(22) PCT Filed: Dec. 16, 1999

(86) PCT No.: PCT/DE99/04013

§ 371 (c)(1),
(2), (4) Date: Oct. 28, 2002

(87) PCT Pub. No.: WO01/44021

PCT Pub. Date: Jun. 21, 2001

(51) Int. Cl.[7] .......................... H02G 3/00; G01R 27/26
(52) U.S. Cl. .................... 307/10.6; 324/522; 280/735
(58) Field of Search ............................ 307/10.1, 10.6; 280/735, 734; 180/282, 271; 324/505, 522, 769, 537

(56) References Cited

U.S. PATENT DOCUMENTS 5,882,034 A * 3/1999 Davis et al. ................. 280/735

FOREIGN PATENT DOCUMENTS

DE    197 32 677 A1    3/1999
WO    WO 97/29932     8/1997

* cited by examiner

Primary Examiner—Rajnikant B. Patel
(74) Attorney, Agent, or Firm—Morrison & Foerster LLP

(57) ABSTRACT

The invention relates to an ignition device for a pyrotechnic occupant protective system which contains an ignition unit (18), an ignition switch (20) and an electronic unit (4). A voltage output (14) of the electronic unit (4) can be charged via an external supply line (10) up to a predetermined ignition voltage. The ignition switch (20) can be closed by a signal, which can be generated on the control output, so that the ignition voltage is discharged while passing through the ignition unit (18). The electronic unit (4) can be controlled in such a manner that test signals of a predeterminable duration can be generated on the control output (22) and the function of the ignition unit can be tested by using these test signals.

15 Claims, 1 Drawing Sheet

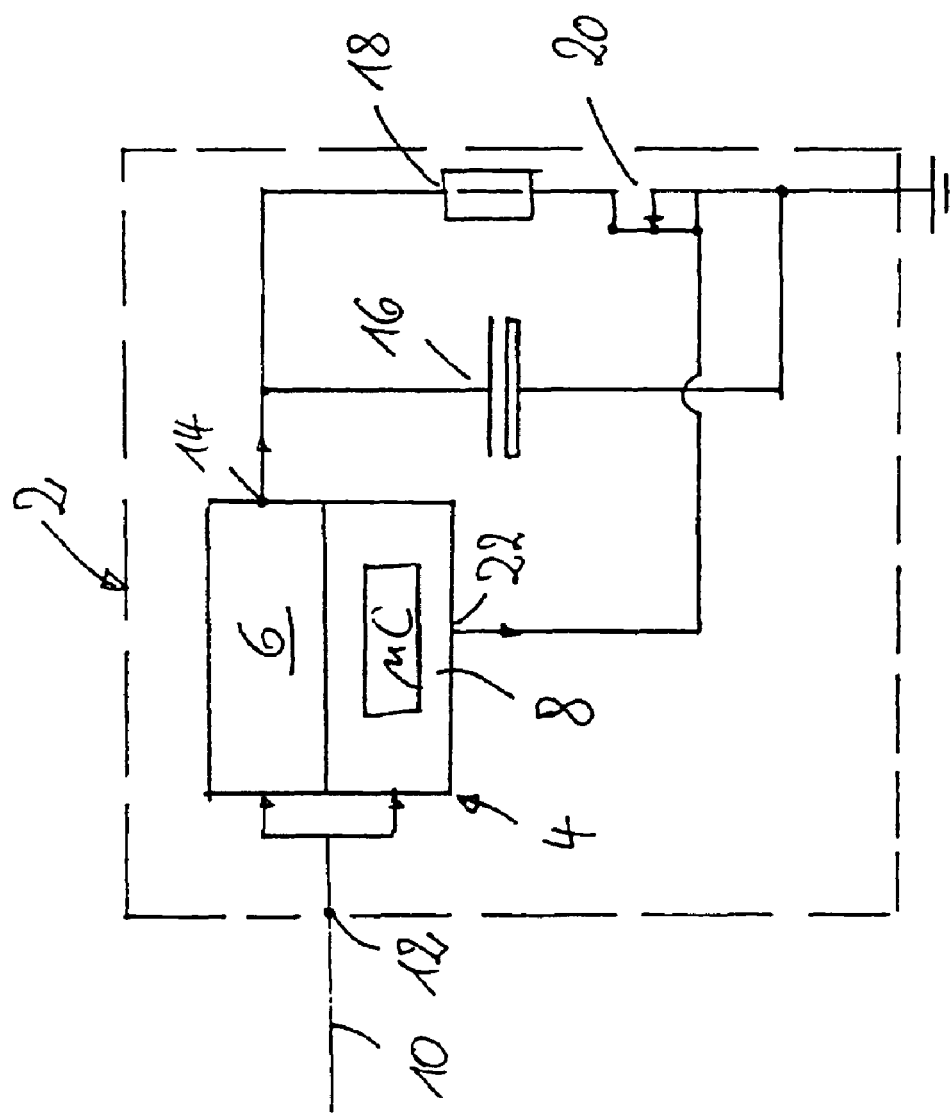

SYSTEM AND METHOD FOR TESTING AN IGNITION DEVICE

CLAIM FOR PRIORITY

This application is based on PCT/DE99/04013 filed 16 Dec. 1999.

TECHNICAL FIELD OF THE INVENTION

The invention relates to a system and method for testing an ignition device.

BACKGROUND OF THE INVENTION

Ignition devices for pyrotechnic occupant protection devices in motor vehicles, for example airbags, belt tighteners, etc. have to have a high level of functional reliability. Ignition devices such as these are subjected to a so-called "Bruceton" test for quality assurance. In this case, a number of samples are taken from a batch of ignition units, for example, ignition pellets. A first voltage is then applied to a first ignition unit. If the ignition unit still does not ignite at this voltage, the voltage is increased until ignition takes place. After the ignition of the ignition unit, the voltage at which the first ignition unit ignited is somewhat reduced for a second ignition unit. If the second ignition unit does not ignite, its voltage is once again slightly increased until ignition takes place, etc.

A further test, frequently a 100% test, that is to a say a test which is carried out with every ignition unit that is manufactured, is the so-called "Thermal Transition Test (TTT)". If there is a poor connection between the pyrotechnic device and an ignition wire of the ignition unit, it is in some circumstances possible for the ignition wire to melt without the pyrotechnic device being ignited. A poor connection may occur, for example, as a result of a bubble in the pyrotechnic material, or as a result of dirt on the ignition wire. In order to make it possible to assess the contact between the ignition wire and the pyrotechnic device, the ignition wire has a defined current applied to it, which is well below the triggering threshold. Depending on the connection to the pyrotechnic device, the ignition wire changes its resistance, with a small resistance change indicating a good connection, and a high resistance change indicating a poor connection.

Conventional ignition devices have connections via which the ignition unit is directly electrically accessible, for example a melting wire. In modern ignition devices, which are driven via an ignition bus and have their own integrated electronics units (smart igniter technology), the melting wire of the ignition unit is no longer directly electrically accessible. Instead of this, the ignition bus is connected to an electronics unit, which produces a well-defined and stabilized ignition voltage at a voltage output from a supply voltage which is provided on the ignition bus, and allows energy to be supplied to the ignition pellet only when an ignition signal is supplied via the ignition bus. This results in a high level of operational safety. However, the described tests are no longer possible, since the ignition element itself, such as a melting wire, a thin film element, a thick film element, a so-called silicon bridge wire etc., is not accessible for voltage to be applied directly.

SUMMARY OF THE INVENTION

The invention discloses a test method for ignition devices which can be driven via an ignition bus, which test method leads to reliable results, while being simple to carry out.

In one embodiment of the invention, the ignition voltage source, when it is connected to the ignition unit, not to be discharged such that ignition takes place if the ignition unit is functional, but for the ignition unit to be connected to the ignition voltage source during short time intervals, which can be predetermined. In this case, the ignition voltage source essentially remains at its defined ignition voltage, so that the energy flowing out through the ignition unit is produced for the duration of the time interval.

The variable voltage which is required for the conventional tests described in the introduction is replaced by variable time intervals, during which a portion of the energy stored in the ignition voltage source flows out through the ignition unit. The energy stored in the ignition voltage source may flow out in incremental units or "portion by portion", in which case the magnitude of the incremental units and the time duration can be produced by appropriate driving and/or programming of circuits included in the ignition device from the exterior, for example, via the ignition bus.

In one aspect of the invention, it possible to program an ignition device for specific tests in advance.

In another aspect of the invention, the test results have a high degree of accuracy, since the test voltage may be assumed to be constant.

In still another aspect of the invention, it possible to determine the connection between pyrotechnic material and the heating or melting element. Furthermore, faults can be found in the heating or melting element itself.

In yet another aspect of the invention, it is particularly simple to test the ignition device in an automated manner.

In another aspect of the invention, it possible to inhibit the capability to carry out tests after completion of quality assurance tests during and at the end of production of the ignition device, so that simplified test routines can be carried out, if required, when installed in the motor vehicle, but while otherwise ensuring that the ignition unit ignites in conjunction with the ignition voltage source.

BRIEF DESCRIPTION OF THE DRAWINGS

The invention will be explained in the following text with reference to a block diagram, which is illustrated in the single FIGURE, the FIGURE, in which:

FIG. 1 illustrates an exemplary embodiment of an ignition device according to the invention.

DETAILED DESCRIPTION OF THE PREFERRED EMBODIMENTS

FIG. 1 illustrates an ignition device, which is annotated overall as 2, includes of an electronics unit 4 with a voltage section 6 and a control section 8.

A supply line, for example an ignition bus 10, is connected via a connection 12 of the ignition device 2, not only to the voltage section 6 but also to the control section 8.

A voltage output 14 of the voltage section 6 is connected to an ignition capacitor 16 and to an ignition unit 18, for example an ignition pellet, which is connected via an ignition switch 20, for example a switching transistor, to that side of the ignition capacitor 16 which is averted from the voltage output 14, or to ground.

A control output 22 of the control section 8 is connected to a control input of the ignition switch 20.

The basic operation of the ignition device 2 which has been described and is advantageously in the form of an integrated unit is known per se, and is as follows.

The voltage section 6 converts a DC or AC voltage which is supplied via the ignition bus 10 to an ignition voltage of about 25 volts, for example, to which the ignition capacitor 16, which has a capacitance of approximately 2.2 $\mu$F by way of example, is charged. When the control section 8 identifies an ignition signal that has been supplied via the ignition bus 10, the control section 8 produces at its control output 22 an ignition signal in the form, for example, of a voltage change, in response to which the ignition switch 20 is switched on and the ignition capacitor 16 is discharged through the ignition unit 18, igniting it. A current which lasts, for example, for 10 microseconds and which is typically 3.5 amperes leads to the pyrotechnic material being ignited by a glow wire. The ignition unit has a typical pure resistance value of 2–10 ohms. The additional pure resistance of the discharge circuit from the ignition capacitor 16 through the ignition unit 18 and the ignition switch 20 is typically less than 5 ohms.

According to the invention, the control section 8, which includes a microprocessor with associated memory devices, can be programmed via the ignition bus 10 such that test pulses or ignition pulses with a duration which can be predetermined can be produced at the control output 22, for the duration of which the ignition switch 20 is closed, so that the ignition capacitor 16, which is charged to the ignition voltage, discharges via the ignition unit 18, only for the predetermined period or the predetermined time interval of the test pulse, so that the ignition unit 18 is supplied with a small portion of the energy stored in the ignition capacitor 16.

The Bruceton test, which was mentioned in the introduction, can be carried out in a modified form in that the energy which is required to ignite the ignition unit is determined by varying the length of the test pulse which appears at the control output 22. Instead of the voltage change which was described in the introduction, a time duration change occurs, with the time period which is determined on a tested ignition device and is required for ignition being used as the start value for changing the time period of the next ignition device to be changed. One advantage of the test method according to the invention is that tolerances in the ignition path (ignition capacitor, connecting lines, ignition switch) can also be included, and, in contrast in "worst case" situations in manufacture can be identified on a batch basis.

It is readily understood by those skilled in the art that widely differing ways of carrying out the test are feasible, depending on the hardware and software complexity in the control section 8 and in any external test device. By way of example, the control section 8 may be programmed such that ignition or test signals of increasing length are produced at the control output 22 automatically during a test, until the ignition unit 18 ignites. The determined duration of the test signal can be read via the ignition bus 10 and is available for testing a further ignition device, which starts with a somewhat shorter time period.

Alternatively, the control output 22 may have test pulses of different duration applied to it directly via the ignition bus 10, in a test mode. The duration required for ignition is in each case stored. Ignition is defined as taking place, for example, when no current flows through the ignition unit 18 when a test or ignition signal is applied to the control output 22. The current through the ignition unit 18 may be defined specifically by means of voltage taps which are not illustrated, on the ignition unit or by means of a measurement resistor which is arranged in the corresponding line path.

The TTT test which is described in the introduction can likewise be carried out in a simple manner with the described circuit. By way of example, the typical ignition energy of an ignition element, for example a melting wire or a thin film element, is determined without any pyrotechnic device. Owing to the lack of thermal capacity of the pyrotechnic device, the ignition energy required is considerably less than with the pyrotechnic device. As a second value, the ignition energy required is determined using the above-mentioned Bruceton test, that is the time period during which the ignition unit 18, provided with the pyrotechnic device, must be connected to the ignition capacitor 16 in order to ignite. The time period within which the ignition element burns away in the event of a poor connection between the pyrotechnic device and the ignition element, without the pyrotechnic device being ignited, is between the two above-mentioned time periods.

The time period or test energy chosen on the basis of the above-mentioned criteria may be used as a 100% screening measure in the manufacturing process for the ignition devices. In the event of a poor connection or if the pyrotechnic device is accidentally missing, the ignition element burns away (the melting wire burns through), and the faulty ignition device can be segregated out.

A time resolution of one microsecond is generally sufficient for the basic digital intervals for the portioning of the discharging of the ignition capacitor. Future firing bus systems operate with a bit rate of 1 MHz, as a result of which such a time base is feasible. For even better resolution, the bus clock rate could be increased to 4 MHz in the test mode, resulting in the feasibility of a graduation of 250 nanoseconds. In order to resolve an overall time period of 32 microseconds, which is generally sufficient in steps of 250 nanoseconds, it is feasible with an acceptable amount of effort, using a 7-bit counter.

The ignition device according to the invention can be modified in many ways. The control section 8 of the electronics unit 4 may, for example, be in the form of a digital switching mechanism, which contains a switching element which automatically blocks a path which carries out a test as soon as a test has been completed.

Furthermore, a number of ignition units 18 and ignition switches 20 may be provided.

What is claimed is:

1. A method for testing an ignition device for a pyrotechnic occupant protection device, comprising:
    discharging an ignition voltage source of the ignition device through an ignition unit when an ignition signal is applied to an ignition switch; and
    applying test signals to the ignition switch for a predetermined time duration.

2. An ignition device for a pyrotechnic occupant protection device, comprising:
    an ignition unit;
    an ignition switch; and
    an electronics unit having
        an input for connection to an external supply line,
        a voltage output for connection to the ignition unit, and
        a control output for connection to the ignition switch, wherein
        the voltage output is configured to be charged to a predetermined ignition voltage via the supply line, which predetermined ignition voltage is discharged through the ignition unit when an ignition signal is applied to the control output, and switching the ignition switch in a corresponding manner, and the electronics unit is configured to be driven such that test signals with a predetermined time duration are produced at the control output.

3. The ignition device as claimed in claim 2, wherein the electronics unit includes a programmable module for programming at least one predetermined time duration.

4. The ignition device as claimed in claim 2 further comprising an ignition voltage capacitor connected in parallel with the voltage output, wherein the predetermined time period is short compared to the time duration during which the ignition voltage capacitor discharges a major proportion of energy stored therein through the ignition unit.

5. The ignition device as claimed in claim 2, further comprising a device provided for measurement of an electrical resistance of the ignition unit.

6. The ignition device as claimed in claim 3, wherein the ignition capacitor is charged to a voltage which is required for ignition of the ignition unit, the programmable module is programmed, and a test signal is applied to the control output through the supply line.

7. The ignition device as claimed in claim 2, further comprising an apparatus to inhibit the capability to apply test signals to the control output once a test cycle has been carried out.

8. The ignition device as claimed in claim 3, further comprising an ignition voltage capacitor connected in parallel with the voltage output, wherein the predetermined time period is short compared to the time duration during which the ignition voltage capacitor discharges a major proportion of energy stored therein through the ignition unit.

9. The ignition device as claimed in claim 3, further comprising a device provided for measurement of an electrical resistance of the ignition unit.

10. The ignition device as claimed in claim 4, further comprising a device provided for measurement of an electrical resistance of the ignition unit.

11. The ignition device as claimed in claim 4, wherein the ignition capacitor is charged to a voltage which is required for ignition of the ignition unit, the programmable module is programmed, and a test signal is applied to the control output through the supply line.

12. The ignition device as claimed in claim 3, further comprising an apparatus to inhibit the capability to apply test signals to the control output once a test cycle has been carried out.

13. The ignition device as claimed in claim 4, further comprising an apparatus to inhibit the capability to apply test signals to the control output once a test cycle has been carried out.

14. The ignition device as claimed in claim 5, further comprising an apparatus to inhibit the capability to apply test signals to the control output once a test cycle has been carried out.

15. The ignition device as claimed in claim 6, further comprising an apparatus to inhibit the capability to apply test signals to the control output once a test cycle has been carried out.

* * * * *